(12) United States Patent
Katsuno et al.

(10) Patent No.: US 10,302,128 B2
(45) Date of Patent: May 28, 2019

(54) COMBINED BALL BEARING, MAIN SPINDLE DEVICE, AND MACHINE TOOL

(71) Applicant: NSK LTD., Tokyo (JP)

(72) Inventors: Yoshiaki Katsuno, Fujisawa (JP); Shoichiro Oguri, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/749,931

(22) PCT Filed: Aug. 3, 2016

(86) PCT No.: PCT/JP2016/072807
§ 371 (c)(1),
(2) Date: Feb. 2, 2018

(87) PCT Pub. No.: WO2017/022798
PCT Pub. Date: Feb. 9, 2017

(65) Prior Publication Data
US 2018/0238384 A1 Aug. 23, 2018

(30) Foreign Application Priority Data
Aug. 5, 2015 (JP) ................................. 2015-155270

(51) Int. Cl.
*F16C 19/56* (2006.01)
*F16C 19/16* (2006.01)
(Continued)

(52) U.S. Cl.
CPC ............ *F16C 19/56* (2013.01); *F16C 19/163* (2013.01); *F16C 19/541* (2013.01);
(Continued)

(58) Field of Classification Search
CPC .... F16C 19/163; F16C 19/541; F16C 19/546; F16C 19/56; F16C 35/12; F16C 25/32;
(Continued)

(56) References Cited

U.S. PATENT DOCUMENTS

| 4,938,615 A * | 7/1990 | Baker | ................... | B21B 31/07 |
| | | | | 29/895.2 |
| 6,431,760 B1 * | 8/2002 | Nawamoto | ............ | F16C 19/54 |
| | | | | 384/475 |

(Continued)

FOREIGN PATENT DOCUMENTS

| CA | 2061216 C | * | 11/1994 | ............. | E21B 4/003 |
| CN | 201105324 Y | | 8/2008 | | |

(Continued)

OTHER PUBLICATIONS

International Search Report, issued by International Searching Authority in corresponding International Application No. PCT/JP2016/072807, dated Sep. 13, 2016, (PCT/ISA/210).

(Continued)

*Primary Examiner* — Marcus Charles
(74) *Attorney, Agent, or Firm* — Sughrue Mion, PLLC

(57) ABSTRACT

A matched ball bearing includes four or more rows of angular ball bearings axially aligned, two or more rows of the angular ball bearings with contact angles in a same direction being arranged in a back-to-back combination. The respective angular ball bearings have same inner diameters, respectively. The respective angular ball bearings with contact angles in the same direction have same outer diameters, respectively. The respective angular ball bearings with contact angles in different directions have different outer diameters, respectively. With respect to at least the respective angular ball bearings having the larger outer diameters, the angular ball bearing positioned at an axially outboard side has a ball diameter and a contact angle greater than those of the angular ball bearing positioned at an axially inboard side.

10 Claims, 7 Drawing Sheets

(51) Int. Cl.
*F16C 19/54* (2006.01)
*F16C 35/12* (2006.01)
*F16C 33/32* (2006.01)
*F16C 25/08* (2006.01)

(52) U.S. Cl.
CPC ............ *F16C 19/546* (2013.01); *F16C 25/08* (2013.01); *F16C 33/32* (2013.01); *F16C 35/12* (2013.01); *F16C 2300/22* (2013.01); *F16C 2322/39* (2013.01)

(58) Field of Classification Search
CPC .. F16C 25/08; F16C 2322/39; F16C 2300/22; F16C 33/32
USPC ........ 384/491, 504, 506, 513, 517, 516, 520
See application file for complete search history.

(56) References Cited

U.S. PATENT DOCUMENTS

| | | | | |
|---|---|---|---|---|
| 8,388,231 | B2* | 3/2013 | Pahle | F16C 19/182 |
| | | | | 29/898.061 |
| 8,734,021 | B2* | 5/2014 | Suzuki | F16C 33/6674 |
| | | | | 384/473 |
| 9,455,530 | B2* | 9/2016 | Patel | H01R 13/652 |
| 2006/0193546 | A1* | 8/2006 | Thompson | F16C 19/52 |
| | | | | 384/513 |
| 2007/0242914 | A1* | 10/2007 | Friedl | F16C 19/185 |
| | | | | 384/506 |
| 2009/0034895 | A1* | 2/2009 | Zlipko | F16C 33/605 |
| | | | | 384/513 |
| 2010/0046872 | A1 | 2/2010 | Takiuchi et al. | |
| 2010/0254644 | A1 | 10/2010 | Pahle et al. | |
| 2016/0102705 | A1* | 4/2016 | Mei | F04D 29/051 |
| | | | | 310/90.5 |

FOREIGN PATENT DOCUMENTS

| | | | | |
|---|---|---|---|---|
| CN | 101670623 | A | 3/2010 | |
| CN | 201723447 | U | 1/2011 | |
| CN | 103003014 | A | 3/2013 | |
| DE | 102006020271 | A1 | 11/2006 | |
| DE | 102007049982 | A1 | 4/2009 | |
| EP | 482364 | A1 * | 4/1992 | ............ F16C 43/06 |
| EP | 2735392 | A1 | 5/2014 | |
| JP | 2004-263816 | A | 9/2004 | |
| JP | 2005299761 | A * | 10/2005 | ............ F16C 19/163 |
| JP | 2006-307912 | A | 11/2006 | |
| JP | 2006-322496 | A | 11/2006 | |
| JP | 2007-1010 | A | 1/2007 | |
| JP | 2008-133887 | A | 6/2008 | |
| KR | 20060113503 | A * | 11/2006 | ............ F16C 19/163 |
| WO | WO 2016063691 | A1 * | 4/2016 | ............ F16C 19/16 |

OTHER PUBLICATIONS

Written Opinion, issued by International Searching Authority in corresponding International Application No. PCT/JP2016/072807, dated Sep. 13, 2016, (PCT/ISA/237).
Communication dated Apr. 30, 2018, from the European Patent Office in counterpart European Application No. 16833077.7.
Communication dated Oct. 12, 2018, from the State Intellectual Property Office of People's Republic of China in counterpart Application No. 201680046043.0.

* cited by examiner

COMBINED BALL BEARING, MAIN SPINDLE DEVICE, AND MACHINE TOOL

CROSS REFERENCE TO RELATED APPLICATION(S)

This application is a National Stage Application under 35 U.S.C. § 371 of International Application No. PCT/JP2016/072807, filed on Aug. 3, 2016, and claims priority from Japanese Patent Application No. 2015-155270, filed in the Japanese Patent Office on Aug. 5, 2015, the disclosures of which are herein incorporated by reference in their entireties.

TECHNICAL FIELD

The present invention relates to a matched ball bearing, a main spindle device, and a machine tool, and more specifically, to a matched ball bearing that is to be used for a high-speed rotation main spindle device of a built-in motor type to be used in a machine tool and a general industrial machine, a main spindle device having the matched ball bearing, and a general machine tool or combined processing machine tool having the main spindle device.

RELATED ART

FIG. 7 depicts a structure of a built-in motor type main spindle device disclosed in Patent Document 1. In FIG. 7, a housing of a main spindle head 101 is divided into a front housing 102 and a rear housing 103, both of which are fastened by bolts 104. A main spindle 105 is supported to the front housing 102 via front bearings 106, 107 and is also supported to the rear housing 103 via rear bearings 108, 109 and a bearing case 110. Also, the main spindle 105 has a built-in motor rotor 111, a draw bar 112 for clamping a tool, and the like.

Also, as another spindle device, a structure having four angular ball bearings as a front bearing is disclosed (for example, refer to Patent Document 2).

CITATION LIST

Patent Documents

Patent Document 1: JP-A-2007-1010
Patent Document 2: JP-A-2004-263816

SUMMARY OF THE INVENTION

Problems to be Solved

The four angular ball bearings disclosed in Patent Document 2 have the same configurations. In the meantime, high-precision processing due to an increase in stiffness of the main spindle, an increase in fatigue lifetime of a bearing, and improvement on seizure resistance are needed, so that additional improvements are required. Also, in the spindle device, when a load is applied to a tip end of an edged tool due to collision of the main spindle, the edged tool-side bearing is most applied with the load, so that an indentation is likely to be formed at a contact part between a ball and a raceway surface. Therefore, improvement on a shock resistance is also needed.

Also, according to the spindle device disclosed in Patent Document 1, bridging parts of stator coils referred to as end coils 114 protrude from both axial end portions of a stator 113 of the built-in motor. In the spindle device of FIG. 7, the front housing 102 having the front bearings 106, 107 internally fitted thereto is formed at axially outboard sides of the end coils 114, so that a span between the front and rear bearings 106, 107, 108, 109 is large. For this reason, an entire length of the main spindle 105 increases, so that an entire size increases.

The present invention has been made in view of the above situations, and an object thereof is to provide a matched ball bearing, a spindle device, and a machine tool capable of contributing to high-precision processing due to an increase in stiffness of a main spindle, an increase in fatigue lifetime of a bearing, and improvements on seizure resistance and shock resistance.

Means for Solving Problems

The object of the present invention is achieved by following configurations.

(1) A matched ball bearing comprising four or more rows of angular ball bearings axially aligned, two or more rows of the angular ball bearings with contact angles in a same direction being arranged in a back-to-back combination,
wherein the respective angular ball bearings have same inner diameters, respectively,
wherein the respective angular ball bearings with contact angles in the same direction have same outer diameters, respectively,
wherein the respective angular ball bearings with contact angles in different directions have different outer diameters, respectively, and
wherein with respect to at least the respective angular ball bearings having the larger outer diameters, the angular ball bearing positioned at an axially outboard side has a ball diameter and a contact angle greater than those of the angular ball bearing positioned at an axially inboard side.

(2) The matched ball bearing of the above (1), wherein with respect to at least the respective angular ball bearings having the larger outer diameters, the angular ball bearing positioned at the axially outboard side has a ball pitch circle diameter greater than that of the angular ball bearing positioned at the axially inboard side.

(3) A spindle device comprising a rotary shaft rotatably supported to a housing via front and rear bearings and configured to be rotatively driven by a built-in motor,
wherein the front bearing is configured by the matched ball bearing of the above (1) or (2), and
wherein each angular ball bearing having a smaller outer diameter is configured as a motor-side bearing close to the built-in motor and each angular ball bearing having a larger outer diameter is configured as a motor opposite-side bearing spaced from the built-in motor with respect to the motor-side bearing.

(4) The spindle device of the above (3),
wherein the housing comprises:
an outer cylinder housing to which a stator of the built-in motor is mounted,
a front bearing housing which is provided at a front part of the outer cylinder housing and to which an outer ring of the front bearing is internally fitted, and
a rear bearing housing which is provided at a rear part of the outer cylinder housing and to which an outer ring of the rear bearing is internally fitted or is supported via a bearing sleeve,
wherein an outer peripheral surface of the front bearing housing has a stepped shape having a large-outer peripheral surface and a small-diameter outer peripheral surface, wherein at least a part of the small-diameter outer peripheral surface of the front bearing housing is arranged at an inner side of an end coil of the stator so as to overlap the end coil of the stator, as seen from a radial direction, and wherein at least one of the motor-side bearings is internally fitted to the front bearing housing at a position at which it overlaps the small-diameter outer peripheral surface of the front bearing housing, as seen from the radial direction.

(5) The spindle device of the above (4), wherein the motor-side bearing and the motor opposite-side bearing are applied with a fixed-position preload, and wherein an outer ring of the motor-side bearing is internally fitted to the front bearing housing with a fitting gap.

(6) The spindle device of the above (4) or (5), wherein the motor-side bearing and the motor opposite-side bearing are applied with a fixed-position preload, and wherein an outer ring of the motor-side bearing is axially positioned with respect to the front bearing housing with an axial gap.

(7) The spindle device of any one of the above (4) to (6), wherein an outer ring of the rear bearing is internally fitted to the bearing sleeve and the bearing sleeve is internally fitted to the rear bearing housing, and wherein at least a part of the bearing sleeve is arranged at an inner side of an end coil of the stator so as to overlap the end coil of the stator, as seen from the radial direction.

(8) The spindle device of one of the above (4) to (6), wherein an outer ring of the rear bearing is internally fitted to the rear bearing housing, and wherein at least a part of the rear bearing housing is arranged at an inner side of an end coil of the stator so as to overlap the end coil of the stator, as seen from the radial direction.

(9) A machine tool including the spindle device of one of the above (3) to (8).

(10) The machine tool of the above (9), wherein the spindle device is mounted on a tilt mechanism or a swivel mechanism.

Effects of the Invention

According to the matched ball bearing of the present invention, the two or more rows of angular ball bearings with the contact angles in the same direction are arranged in the back-to-back combination, the respective angular ball bearings have the same inner diameters, respectively, the angular ball bearings with the contact angles in the same direction have the same outer diameters, respectively, and the angular ball bearings with the contact angles in the different directions have the different outer diameters, respectively. Also, with respect to at least the angular ball bearings having the larger outer diameters, the angular ball bearing positioned at the axially outboard side has the ball diameter and contact angle greater than the angular ball bearing positioned at the axially inboard side. Thereby, when each matched ball bearing is applied to the spindle device and each angular ball bearing having the larger outer diameter is arranged at a load applying side (for example, an edged tool-side, to which a cutting load is to be applied, of a spindle device for machine tool) to which a radial load or axial load is to be applied, it is possible to contribute to high-precision processing due to an increase in stiffness (moment stiffness and axial stiffness) of the main spindle, an increase in fatigue lifetime of the bearing, and improvement on seizure resistance. Also, it is possible to suppress an occurrence of an indentation of the angular ball bearing positioned at the axially outboard side, which is most applied with the load when the load is applied to a tip end of the main spindle, and to improve the shock resistance.

DETAILED DESCRIPTION OF EMBODIMENTS

Hereinafter, a matched ball bearing and a spindle device in accordance with each embodiment of the present invention will be described in detail with reference to the drawings.

First Embodiment

Figure 1:
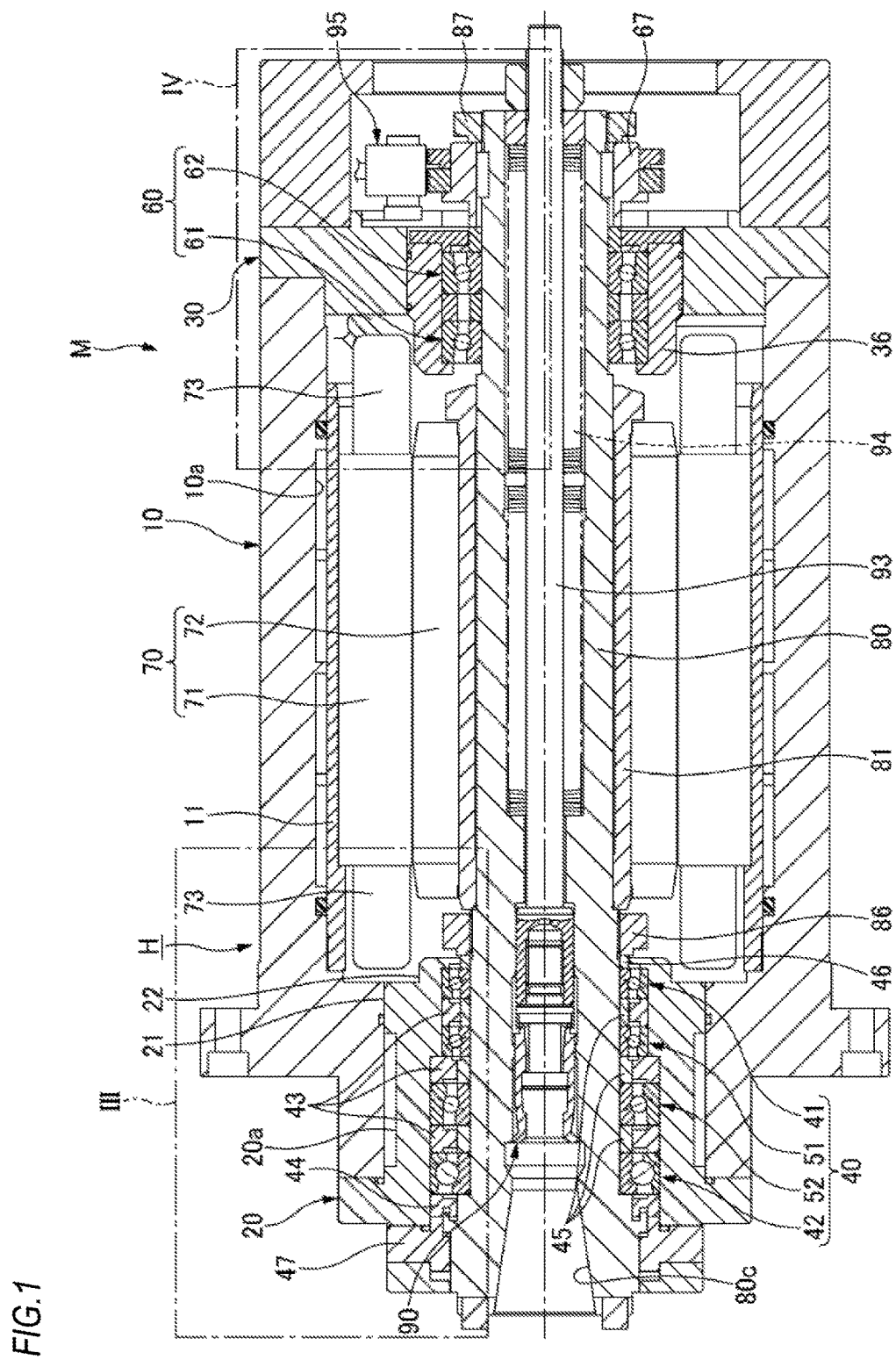
FIG. 1 is a sectional view depicting a spindle device in accordance with a first embodiment of the present invention.

A spindle device M of a first embodiment shown in FIG. 1 is a built-in motor type and is used with being mounted to a machine tool having a tilt mechanism or a swivel mechanism. The spindle device M has a rotary shaft 80 rotatably supported to a housing H via front and rear bearings 40, 60 and configured to be rotatively driven by a built-in motor 70.

The housing H has an outer cylinder housing 10 fixed to a bracket of the machine tool (not shown), a front bearing housing 20 provided at a front part of the outer cylinder housing 10, a rear bearing housing 30 provided at a rear part of the outer cylinder housing 10, and a bearing sleeve 36 arranged inside the rear bearing housing 30 and configured to be axially moveable relative to the rear bearing housing 30.

Figure 2:
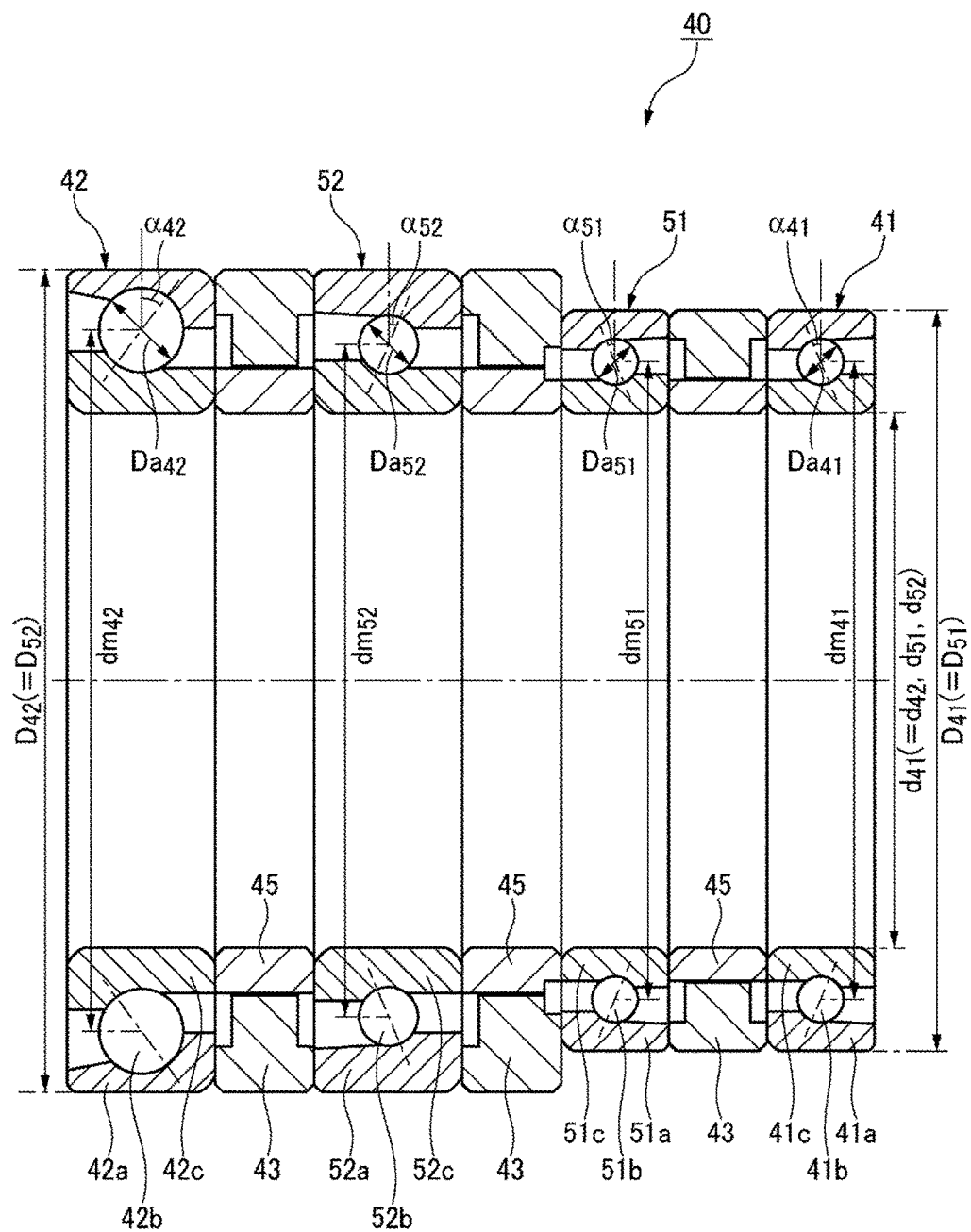
FIG. 2 is a sectional view depicting a matched ball bearing applied as a front bearing.
Figure 3:
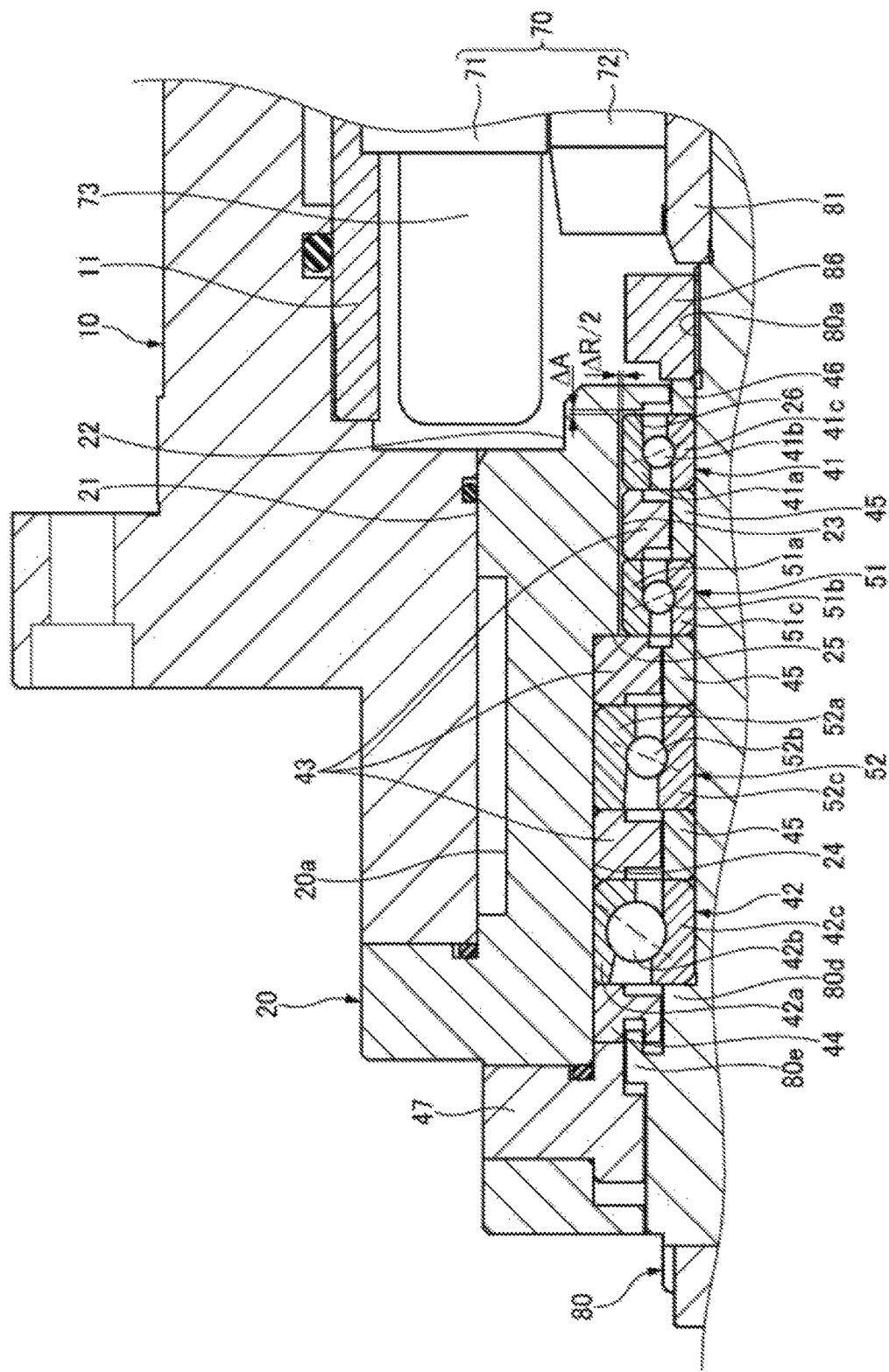
FIG. 3 is an enlarged sectional view of a III part of FIG. 1.

As shown in FIGS. 2 and 3 as well, the front bearing 40 has four rows of angular ball bearings arranged between the front bearing housing 20 and a front part of the rotary shaft 80. That is, the front bearing 40 includes motor-side bearings 41, 51 combined in parallel, having contact angles in the same direction and close to the built-in motor, and motor opposite-side bearings 42, 52 combined in parallel, having contact angles in the same direction and spaced from the built-in motor 70 with respect to the motor-side bearings 41, 51. The motor-side bearings 41, 51 and the motor opposite-side bearings 42, 52 include outer rings 41a, 51a, 42a, 52a internally fitted to the front bearing housing 20, inner rings 41c, 51c, 42c, 52c externally fitted to the rotary shaft 80, and a plurality of balls 41b, 51b, 42b, 52b which are rolling elements configured to roll with contact angles between the outer rings 41a, 51a, 42a, 52a and the inner rings 41c, 51c, 42c, 52c. The motor-side bearings 41, 51 and the motor opposite-side bearings 42, 52 are axially arranged in a back-to-back combination via outer ring spacers 43 and inner ring spacers 45.

In the meantime, the motor-side bearings 41, 51 and the motor opposite-side bearings 42, 52 are also referred to as angular ball bearings 41, 51, 42, 52.

Also, as described later in detail, the outer rings 41a, 51a, 42a, 52a are axially positioned via the outer ring spacers 43, 44 between the front bearing housing 20 and an outer ring retaining member 47 fixed to the front bearing housing 20. Also, the inner rings 41c, 51c, 42c, 52c are axially fixed via the inner ring spacers 45, 46 by fastening a bearing fixing nut 86 to a screw groove 80a formed in the rotary shaft 80 toward a stepped portion 80d of the rotary shaft 80. Thereby, the bearings 41, 51, 42, 52 are applied with a preload.

In the meantime, the bearing fixing nut 86 is arranged between a rear end portion of the front bearing housing 20 and a front end portion of a rotor 72 (in the first illustrative embodiment, a rotor sleeve 81) at an inner side of an end coil 73 of a stator 71, which will be described later. Also, the screw groove 80a to which the bearing fixing nut 86 is screwed is formed on an outer peripheral surface of the rotary shaft 80 to which the front bearing 40 is fitted, and has a diameter greater than an outer peripheral surface to which the rotor sleeve 81 is fitted. Also, the outer peripheral surface of an edged tool-side end portion of the rotary shaft 80 is formed to have a diameter greater than the outer peripheral surface of the rotary shaft 80 to which the front bearing 40 is fitted, and has a seal part 80e configured to form a labyrinth seal structure together with an outer ring spacer 44. Therefore, the rotary shaft 80 is formed so that the diameter of the outer peripheral surface intermittently decreases from the edge tool-side end portion toward the rear.

Figure 4:
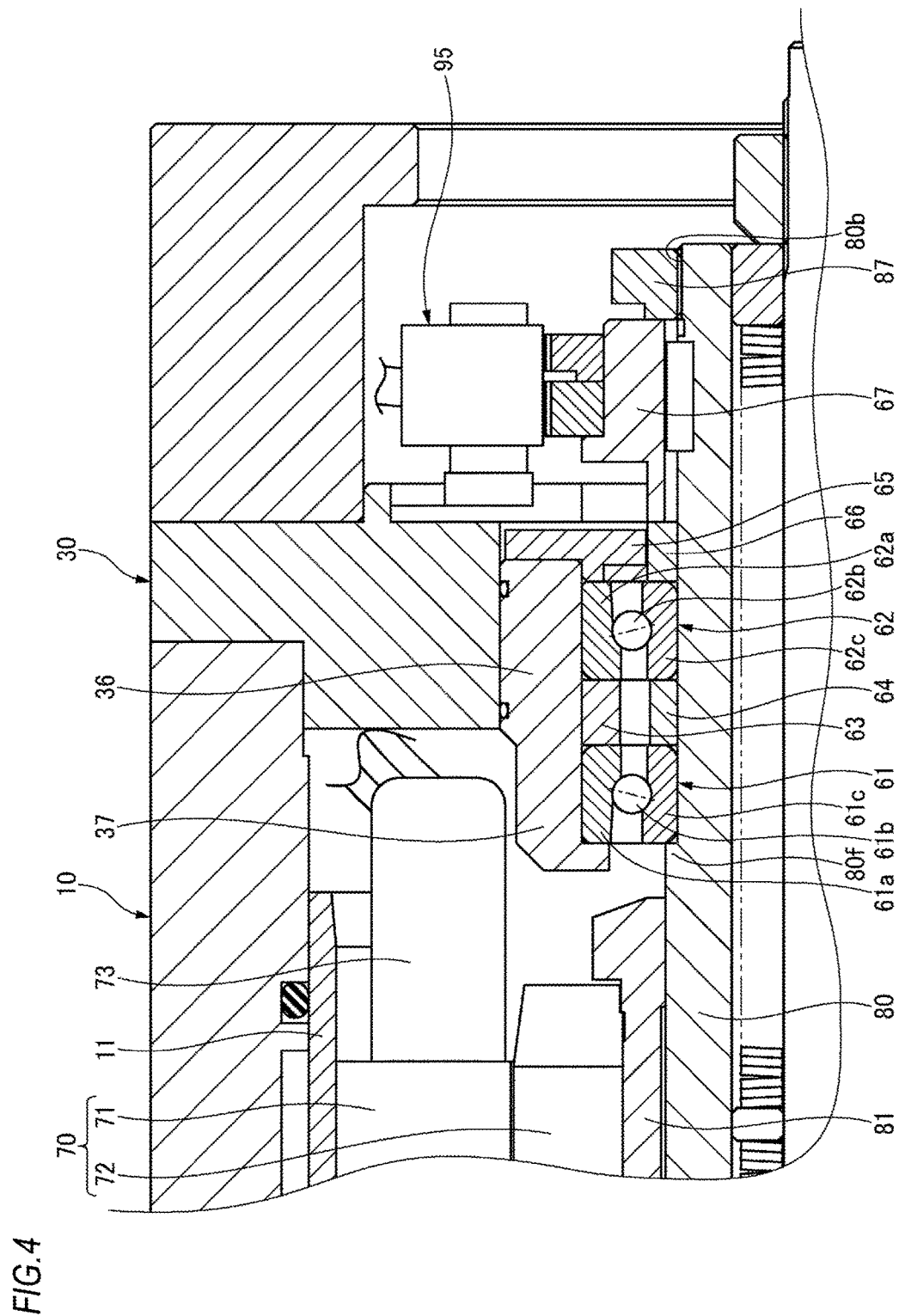
FIG. 4 is an enlarged sectional view of a IV part of FIG. 1.

Also, as shown in FIG. 4, the rear bearing 60 includes a motor-side bearing 61 arranged between the bearing sleeve 36 and a rear part of the rotary shaft 80 and close to the built-in motor and a motor opposite-side bearing 62 spaced from the built-in motor 70 with respect to the motor-side bearing 61. The motor-side bearing 61 and the motor opposite-side bearing 62 are angular ball bearings including outer rings 61a, 62a internally fitted to the bearing sleeve 36, inner rings 61c, 62c externally fitted to the rotary shaft 80 and a plurality of balls 61b, 62b, which are rolling elements configured to roll with contact angles between the outer rings 61a, 62a and the inner rings 61c, 62c, and are arranged in the back-to-back combination via an outer ring spacer 63 and an inner ring spacer 64.

Also, the outer rings 61a, 62a are axially positioned via the outer ring spacer 63 between the bearing sleeve 36 and an outer ring retaining member 65 fixed to the bearing sleeve 36. Also, the inner rings 61c, 62c are axially fixed via the inner ring spacer 66 and a ring member 67 for a part to be detected of a speed sensor 95 by fastening a bearing fixing nut 87 to a screw groove 80b formed in the rotary shaft 80 toward a stepped portion 80f of the rotary shaft 80. Thereby, the bearings 61, 62 are applied with a preload.

Returning to FIG. 1, the built-in motor 70 includes a stator 71 arranged in a space between the front bearing 40 and the rear bearing 60 and fixed to an inner periphery of the outer cylinder housing 10 via a cooling cylinder 11, and a rotor 72 shrinkage-fitted to a rotor sleeve 81 provided on an outer periphery of the rotary shaft 80, and end coils 73 of the stator coil protrude from both axial end portions of the stator 71, as convex portions having a substantially annular shape. In the meantime, the rotor sleeve 81 is shrinkage-fitted to the outer periphery of the rotary shaft 80.

Also, an inner peripheral surface of the outer cylinder housing 10 is formed with a cooling groove 10a, and the cooling cylinder 11 is internally fitted thereto, so that a cooling path is configured. Also, an outer peripheral surface of the front bearing housing 20 is formed with a cooling oil groove 20a between the inner peripheral surface of the outer cylinder housing 10 and the outer peripheral surface of the front bearing housing 20, which are to be fitted to each other, so that another cooling path is configured.

An inner-diameter part of the rotary shaft 80 is incorporated with a draw bar 93 axially extending, a clamping unit 90 provided at a tip end-side of the draw bar 93 and configured to fix a tool holder (not shown) to a tapered portion 80c of the rotary shaft 80, and a dish spring 94 provided between the draw bar 93 and the rotary shaft 80 and configured to pull the clamping unit 90 toward a tool opposite-side. Also, an unclamping unit (not shown) configured to compress the dish spring 94 incorporated to the inner-diameter part of the rotary shaft 80 and to unclamp the tool holder is mounted to the rear of the rear bearing housing 30.

Here, as shown in FIG. 2, the motor-side bearings 41, 51 and the motor opposite-side bearings 42, 52 of the front bearing 40 have the same inner diameters (d41=d51=d42=d52), respectively. Also, the motor-side bearings 41, 51 which have the contact angles in the same direction and the motor opposite-side bearings 42, 52 which have the contact angles in the same direction respectively have the same outer diameters (D41=D51, D42=D52), each other. In contrast, the motor-side bearings 41, 51 and the motor opposite-side bearings 42, 52 have the different outer diameters. Specifically, the motor opposite-side bearings 42, 52 have the outer diameter greater than those of the motor-side bearings 41, 51 (D42=D52>D41=D51).

Also, regarding the motor opposite-side bearings 42, 52 having the larger outer diameters, the angular ball bearings 42 positioned at an axially outboard side is set to have a ball diameter, a contact angle and a ball pitch circle diameter greater than those of the angular ball bearing 52 positioned at an axially inboard side (i.e., Da42>Da52, α42>α52, dm42>dm52).

On the other hand, regarding the motor opposite-side bearings 41, 51 having the smaller outer diameters, the angular ball bearings 41 positioned at the axially outboard side and the angular ball bearing 51 positioned at the axially inboard side are set to have the same ball diameters, contact angles and ball pitch circle diameters (i.e., Da41=Da52, α41=α51, dm41=dm51).

That is, the angular ball bearings 42, 52 having the larger outer diameters are arranged at an edged tool-side to which a cutting load (radial load or axial load) is to be applied, so that it is possible to perform high-precision processing due to an increase in stiffness of the main spindle, and to increase a fatigue lifetime of the bearing.

On the other hand, the motor opposite-side bearings 41, 51 having the smaller outer diameters are arranged at an edged tool opposite-side. Thereby, since the cutting load is small, there are no concerns about decreases in durability and lifetime of the bearing, and there is no problem with respect to the stiffness.

Also, the motor-side bearings 41, 51 have the same outer diameters and the motor opposite-side bearings 42, 52 have the same outer diameters, each other, so that it is possible to suppress increases in processing and mounting costs. If the motor-side bearings 41, 51 have different outer diameters or the motor opposite-side bearings 42, 52 have different outer diameters, the fitting management should be performed at two or four places, which increases the processing man-hour and the processing and mounting costs. Furthermore, if the motor opposite-side bearings 42, 52 have different outer diameters, it is difficult to axially position the outer rings 42a, 52a (to secure an appropriate pressing margin of an outer ring).

Also, since the motor-side bearings 41, 51 have the smaller outer diameters, the ball pitch circle diameters are also smaller, so that it is possible to reduce a value of dmn (multiplication of dm (ball pitch circle diameter) and n (number of revolutions ($min^{-1}$))) of the motor-side bearings 41, 51, which are likely to be applied with a thermal load due to heat generation of the rotor 72. Therefore, it is possible to prevent seizure of the motor-side bearings 41, 51, which are to likely occur upon high-speed rotation.

Also, regarding the angular ball bearings 42, 52 having the larger outer diameter, the angular ball bearing 42 positioned at the axially outboard side is set to have the ball diameter greater than that of the angular ball bearing 52 positioned at the axially inboard side (Da42>Da52). Therefore, a margin load (the lowest load at which an indentation occurs at a contact part between a ball and a raceway surface) of the angular ball bearing 42 positioned at the axially outboard side, which is most applied with the load when the load is applied to the tip end of the edged tool, increases, so that it is possible to suppress occurrence of the indentation and to improve the shock resistance.

Further, the angular ball bearing 42 has the larger ball diameter Da42, so that the heat generation due to rolling friction is increased to some extent. However, the angular ball bearing 42 is positioned at the axially outboard side, so that it is possible to easily release the heat generated by the rolling friction of the bearing itself. That is, a possibility that the angular ball bearing 42 will be seized by the heat generated due to the rolling friction is low. Therefore, even when the heat generation resulting from the rolling friction of the angular ball bearing 42 positioned at the axially outboard side is increased to some extent due to the larger ball diameter, it can be used without any problem.

Also, since the angular ball bearing 42 positioned at the axially outboard side is set to have the contact angle greater than that of the angular ball bearing 52 positioned at the axially inboard side ($\alpha 42 > \alpha 52$), it is possible to increase the axial stiffness of the matched ball bearing and the spindle device.

Although the radial stiffness of the main spindle system is influenced by the bending stiffness of the rotary shaft, in addition to the stiffness of the bearing, it is substantially determined by the stiffness of the bearing. In general, when the contact angle is made large, slips such as spin slip and gyro slip increase, so that an amount of heat generation of the bearing increases. For the angular ball bearings 42 positioned at the axially outboard side, an increase in the amount of heat generation is allowed to some extent. However, the angular ball bearing 52 positioned at the axially inboard side, an increase in the amount of heat generation is not allowed. For this reason, the contact angle of the angular ball bearing 52 positioned at the axially inboard side is made smaller.

Also, since the angular ball bearings 42 positioned at the axially outboard side is set to have the ball pitch circle diameter greater than that of the angular ball bearing 52 positioned at the axially inboard side (dm42>dm52), it is possible to increase a moment length and to improve the moment stiffness of the matched ball bearing and the spindle device.

In the meantime, when the ball pitch circle diameter is increased, the dmn value upon the rotation of the bearing increases, and the heat generation resulting from the rolling friction of the bearing increases. However, as described above, the angular ball bearings 42 positioned at the axially outboard side can be used without any problem even if the heat generation of the bearing increases. However, in the case of the angular ball bearing 52 positioned at the axially inboard side, the increase in the amount of heat generation should be avoided. For this reason, the ball pitch circle diameter dm52 of the angular ball bearing 52 positioned at the axially inboard side is made smaller.

Meanwhile, in the first illustrative embodiment, the relations of the ball diameter, the contact angle and the ball pitch circle diameter of the motor opposite-side bearings 42, 52 having the larger outer diameters and the motor-side bearings 41, 51 having the smaller outer diameters are set to Da42>Da52>Da41=Da51, $\alpha 42 > \alpha 52 \geq \alpha 41 = \alpha 51$, and dm42>dm52>dm41=dm51.

Also, as shown in FIG. 3, in the first illustrative embodiment, the front bearing housing 20 has an outer peripheral surface formed to have a stepped shape having a large-diameter outer peripheral surface 21 fitted to an inner peripheral surface of the outer cylinder housing 10, and a small-diameter outer peripheral surface 22 having a diameter smaller than the large-diameter outer peripheral surface 21. Also, at least a part of the small-diameter outer peripheral surface 22 of the front bearing housing 20 is arranged at the inner side of the end coil 73 of the stator 71 so as to overlap the end coil 73 of the stator 71, as seen from a radial direction.

Also, the motor-side bearing 41 of the front bearing 40, which is positioned at the axially outboard side of the matched ball bearing, is internally fitted to the front bearing housing 20 at a position at which it overlaps the small-diameter outer peripheral surface 22 of the front bearing housing 20, as seen from the radial direction. The inner peripheral surface of the front bearing housing 20 is formed to have a stepped shape having a small-diameter inner peripheral surface 23 to which the motor-side bearings 41, 51 are internally fitted, and a large-diameter inner peripheral surface 24 to which the motor opposite-side bearings 42, 52 are internally fitted. Also, in the first illustrative embodiment, the motor-side bearing 41 is arranged at the inner side of the end coil 73 of the stator 71 so as to overlap the end coil 73 of the stator 71, as seen from the radial direction.

A fitting gap L1 between the outer diameters of the outer rings of the motor opposite-side bearings 42, 52 and the inner diameter of the front bearing housing 20 is set smaller than a fitting gap L2 between the outer diameters of the outer rings of the motor-side bearings 41, 51 and the inner diameter of the front bearing housing 20 (L1<L2).

That is, the fitting gap L1 between the outer diameters of the outer rings of the motor opposite-side bearings 42, 52 and the inner diameter of the front bearing housing 20 is a diameter gap and is set to about 0 μm to 20 μm, more preferably about 0 μm to 10 μm.

In the meantime, the fitting gap L2 between the outer diameters of the outer rings of the motor-side bearings 41, 51 and the inner diameter of the front bearing housing 20 is a diameter gap and is set to a gap (=ΔR) of about 10 μm to 5 mm.

The fitting gap L2 (=ΔR) between the outer diameters of the outer rings of the motor-side bearings 41, 51 and the inner diameter of the front bearing housing 20 is set large, so that during the high-speed rotation, the outer rings 41a, 51a expand into the gap due to an increase in internal preload resulting from the centrifugal force or a temperature difference of the inner and outer rings. The expansion of the outer rings 41a, 51a acts in a direction of reducing the preload, so that it is possible to reduce the entire preload increase of the front bearing 40. Therefore, it is possible to prevent the seizure of the entire front bearing 40 as well as the motor-side bearings 41, 51.

In the meantime, if the fitting gap L2 is greater than 5 mm, it is not possible to secure a planar surface of a shoulder part for fixing the outer rings 42a, 52a of the motor opposite-side bearings 42, 52 for a bearing of which a bearing inner diameter is equal to or smaller than φ100 mm (a standard spindle size).

On the other hand, if the fitting gap L2 is smaller than 10 μm, when the outer rings 41a, 51a expand, the gap disappears, so that the preload reducing effect is insufficient. In the meantime, practically, the fitting gap L2 is preferably about 10 μm to 200 μm.

Also, in the first illustrative embodiment, one ends of the outer rings 42a, 52a of the motor opposite-side bearings 42, 52 are contacted and fixed (or may be directly contacted and fixed) to a shoulder part 25 of the front bearing housing 20 via the outer ring spacers 43 and the other ends are fixed with the outer ring pressing member 47 via the outer ring spacer 44, so that the outer rings are axially positioned.

On the other hand, one end portions of the outer rings 41a, 51a of the motor-side bearings 41, 51 are fixed to the motor opposite-side bearings 42, 52 via the outer ring spacers 43 (or may be directly contacted and fixed to the motor opposite-side bearings 42, 52), and the other end portions are arranged with an axial gap (ΔA) being provided from another should part 26 of the front bearing housing 20. A numerical value of the axial gap ΔA is not particularly limited inasmuch as ΔA>0.

In this case, the outer ring spacer 43 in contact with the shoulder part 25 of the front bearing housing 20 is formed so that inner diameters of notched portions of both end portions are different, i.e., the motor-side end portion is formed to have a diameter smaller than the motor opposite-side end portion so as to be in contact with the outer rings 41a, 51a.

Particularly, in the case of a precision spindle, in order to suppress torsional deformation upon the fastening of the outer rings 41a, 51a, 42a, 52a, the precision of the pressing margin is required to be suppressed to a deviation of several μm to several tens of μm, and it is very difficult to fix the four bearings 41, 51, 42, 52 having the different outer diameters to the shoulder parts 25, 26 at the same time with the appropriate pressing margin.

Like the first illustrative embodiment, when the axial gap (ΔA) is provided, i.e., a width of the outer ring single body of the bearings 41, 41 and a width of the small-diameter inner peripheral surface 23 are set so that ΔA is greater than 0 (ΔA>0), considering a processing error of each single body component of the width of the outer ring single body of the bearings 41, 41 and the width of the small-diameter inner peripheral surface 23, the post-processing and fine adjustment are not required upon the assembling of the main spindle. The front bearing 40 can be axially fixed simply by checking a size difference of the outer ring single body width of the bearings 42, 52 and the outer ring spacers 43, 44 with respect to a width of the large-diameter inner peripheral surface 24 and adjusting a width of the outer ring pressing member 47 (which is similar to a spindle incorporating operation to be normally implemented).

Unlike the present invention, if it is intended to fasten the bearings 41, 51 with the same pressing margin as the front bearing 40, it is necessary to adjust the width of the small-diameter inner peripheral surface 23 (a distance between the shoulder parts 25, 26) by a level of several μm with respect to the outer ring single body width of the bearings 41, 51, and it is very difficult to perform the fine adjustment precision because a part to be processed is an inboard side of a hole. In the meantime, when the spacers 43, 45 are arranged between the bearings 41, 51, like the first illustrative embodiment, it is necessary to perform the adjustment, including the outer ring spacer 43, so that the operation is more troublesome.

Normally, since the front bearing 40 becoming a fixed-side bearing is applied with the fixed-position preload so as to secure the stiffness and the rotation precision, the outer rings 41a, 51a of the motor-side bearings 41, 51 are closely fitted with the outer ring spacers 43 by the preload. Therefore, when the motor opposite-side bearings 42, 52 are fixed as shown in FIG. 2, the outer rings 41a, 51a of the motor-side bearings 41, 51 do not rotate together with the inner rings 41c, 51c even when there is the gaps (ΔR and ΔA).

Also in the above configuration, since the radial load to be applied to the main spindle during the processing is applied by the motor opposite-side bearings 42, 52 having the large size and load capacity, there is no problem.

As described above, the front bearing 40 configuring the matched ball bearing of the first illustrative embodiment includes the two rows of the angular ball bearings 41, 51, 42, 52 with the contact angles in the same direction and arranged in the back-to-back combination, the respective angular ball bearings 41, 51, 42, 52 have the same inner diameters, respectively, the respective angular ball bearings 41, 51, 42, 52 with the contact angles in the same direction have the same outer diameters, respectively, and the respective angular ball bearings 41, 51, 42, 52 with the contact angles in the different directions have the different outer diameters, respectively. With respect to the angular ball bearings 42, 52 having the larger outer diameters, the angular ball bearing 42 positioned at the axially outboard side is set to have the ball diameter and contact angle greater than the angular ball bearing 52 positioned at the axially inboard side. Thereby, when the matched ball bearing is applied to the spindle device and the angular ball bearings 42, 52 having the larger outer diameter are arranged at the edged tool-side to which the cutting load (radial load or axial load) is to be applied, it is possible to contribute to the high-precision processing due to an increase in stiffness (moment stiffness and axial stiffness) of the main spindle, an increase in fatigue lifetime of the bearing, and improvement on seizure resistance. Also, it is possible to suppress an occurrence of an indentation of the angular ball bearing positioned at the axially outboard side, which is most applied with the load when the load is applied to the tip end of the edged tool, and to improve the shock resistance.

Also, with respect to the angular ball bearings 42, 52 having the larger outer diameters, since the angular ball bearing 42 positioned at the axially outboard side is set to have the ball pitch circle diameter greater than the angular ball bearing 52 positioned at the axially inboard side, it is possible to increase the moment stiffness of the matched ball bearing and the spindle device.

Also, in the spindle device M of the first illustrative embodiment, the front bearing housing 20 has the outer peripheral surface formed to have the stepped shape having the large-diameter outer peripheral surface 21 and the small-diameter outer peripheral surface 22, at least a part of the small-diameter outer peripheral surface 22 of the front bearing housing 20 is arranged at the inner side of the end coil 73 of the stator 71 so as to overlap the end coil 73 of the stator 71, as seen from the radial direction of the end coil 73 of the stator 71, and the front bearing 40 has the motor-side bearings 41, 51 close to the built-in motor and the motor opposite-side bearings 42, 52 spaced from the built-in motor 70 with respect to the motor-side bearings 41, 51. The motor-side bearing 41, which is positioned at the axially outboard side of the matched ball bearing, is internally fitted to the front bearing housing 20 at a position at which it overlaps the small-diameter outer peripheral surface 22 of the front bearing housing 20, as seen from the radial direction.

Thereby, it is possible to arrange the motor-side bearing 41 having the smaller outer diameter inside the end coil 73 and to reduce the size of the spindle, which contributes to the reduction in entire length of the rotary shaft 80. Therefore, it is possible to make the axial size of the spindle device M compact and to save the weight thereof.

Also, the span between the front and rear bearings 40, 60 of the rotary shaft 80 is reduced, so that it is possible to increase the natural frequency of the rotary shaft 80, to accomplish the maximum number of revolutions at higher speed, to increase the dynamic stiffness and to reduce the vibrations. Also, the inertia of the rotation part is reduced to improve the quick acceleration and to save the power, so that the energy can be saved. Also, when the spindle device is mounted on a tilt mechanism or a swivel mechanism, it is possible to make a structure of the tilt mechanism or swivel mechanism compact by the compactness and weight-saving of the spindle device M.

Also, in the first illustrative embodiment, the bearing sleeve 36 has the cylindrical part 37, which is arranged at the inner side of the end coil 73 of the stator 71 so as to overlap the end coil 73 of the stator 71, as seen from the radial direction. Therefore, it is possible to further reduce the entire length of the rotary shaft 80. Furthermore, since the motor-side bearing 61 of the rear bearing 60 is arranged at the inner side of the end coil 73 of the stator 71, it is possible to more effectively reduce the entire length of the rotary shaft 80.

Meanwhile, in the first illustrative embodiment, with respect to the angular ball bearings 42, 52 having the larger outer diameters, the angular ball bearing 42 positioned at the axially outboard side is set to have the ball diameter, the contact angle and the ball pitch circle diameter greater than the angular ball bearing 52 positioned at the axially inboard side. However, according to the present invention, the angular ball bearing 42 positioned at the axially outboard side may be set to have at least the ball diameter and the contact angle greater than the angular ball bearing 52 positioned at the axially inboard side.

Also, with respect to the angular ball bearings 41, 51 having the smaller outer diameters, the angular ball bearing 41 positioned at the axially outboard side and the angular ball bearing 51 positioned at the axially inboard side are set to have the same outer diameters, contact angles and ball pitch circle diameters. However, the present invention is not limited thereto. For example, the angular ball bearing 41 positioned at the axially outboard side of the matched ball bearing may be set so that at least one of the ball diameter and the contact angle is greater than the angular ball bearing 51 positioned at the axially inboard side.

Second Embodiment

Figure 5:
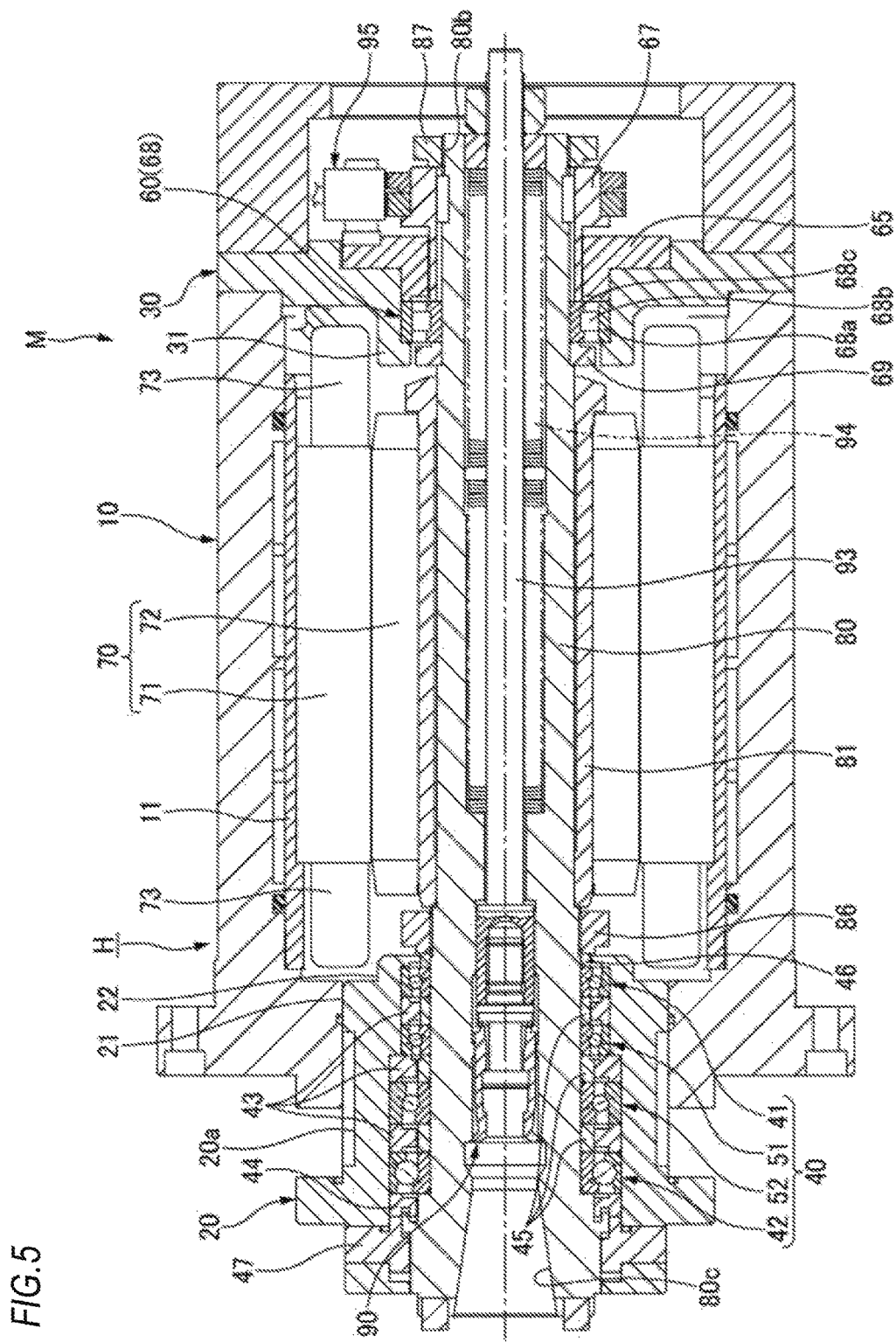
FIG. 5 is a sectional view depicting a spindle device in accordance with a second embodiment of the present invention.

Subsequently, a spindle device relating to a second embodiment of the present invention is described in detail with reference to FIG. 5. In the meantime, the descriptions of the parts, which are the same as or equivalent to the first embodiment, are omitted or simplified.

In the first embodiment, the matched angular ball bearing is used as the rear bearing 60. In the second embodiment, as shown in FIG. 5, a cylindrical roller bearing 68 with single row is used as the rear bearing 60.

For this reason, an outer ring 68*a* of the cylindrical roller bearing 68 is directly internally fitted to the rear bearing housing 30, and is axially fixed by an outer ring retaining member 65 fixed to the rear bearing housing 30. Also, an inner ring 68*c* of the cylindrical roller bearing 68 is externally fitted to the rotary shaft 80, and is axially fixed via an inner ring spacer 69 and a ring member 67 for a part to be detected by fastening the bearing fixing nut 87 to the screw groove 80*b*. A plurality of cylindrical rollers 68*b* is arranged between the outer ring 68*a* and the inner ring 68*c*.

The rear bearing housing 30 has a cylindrical part 31 arranged at the inner side of the end coil 73 of the stator 71 so as to overlap the end coil 73 of the stator 71, as seen from the radial direction. Therefore, the cylindrical roller bearing 68 with single row is used, so that it is possible to further reduce the size, as compared to the spindle device of the first embodiment.

Also, like the second embodiment, at least a part of the cylindrical roller bearing 68 is made to overlap the end coil 73, as seen from the radial direction, so that it is possible to further reduce the size. The other configurations and operations are similar to the first embodiment.

In the meantime, the present invention is not limited to the above embodiments, and can be appropriately modified and improved.

For example, in the embodiments, the inner ring spacers and the outer ring spacers are arranged between the respective angular ball bearings of the four rows of the angular ball bearings arranged in the back-to-back combination. However, the respective inner ring spacers and outer ring spacers may be omitted to further reduce the size.

Also, when the two rows or more of the matched angular ball bearings are applied to the rear bearing, the configurations similar to the front bearing such as the configuration of making the outer diameter of the motor opposite-side bearing outer ring greater than the outer diameter of the motor-side bearing outer ring, like the front bearing, may be adopted.

Figure 6:
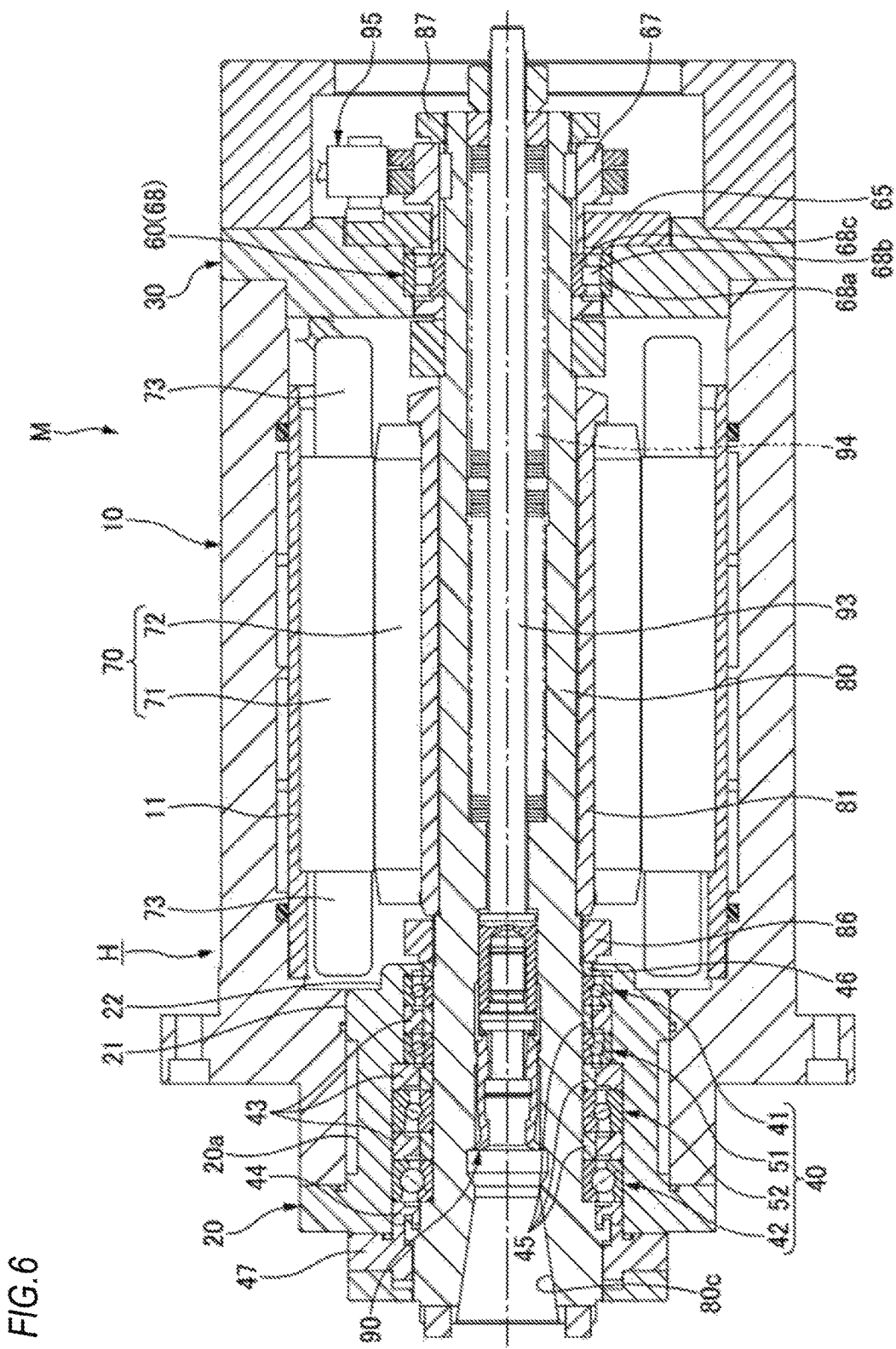
FIG. 6 is a sectional view depicting a spindle device in accordance with a modified embodiment of the present invention.
Figure 7:
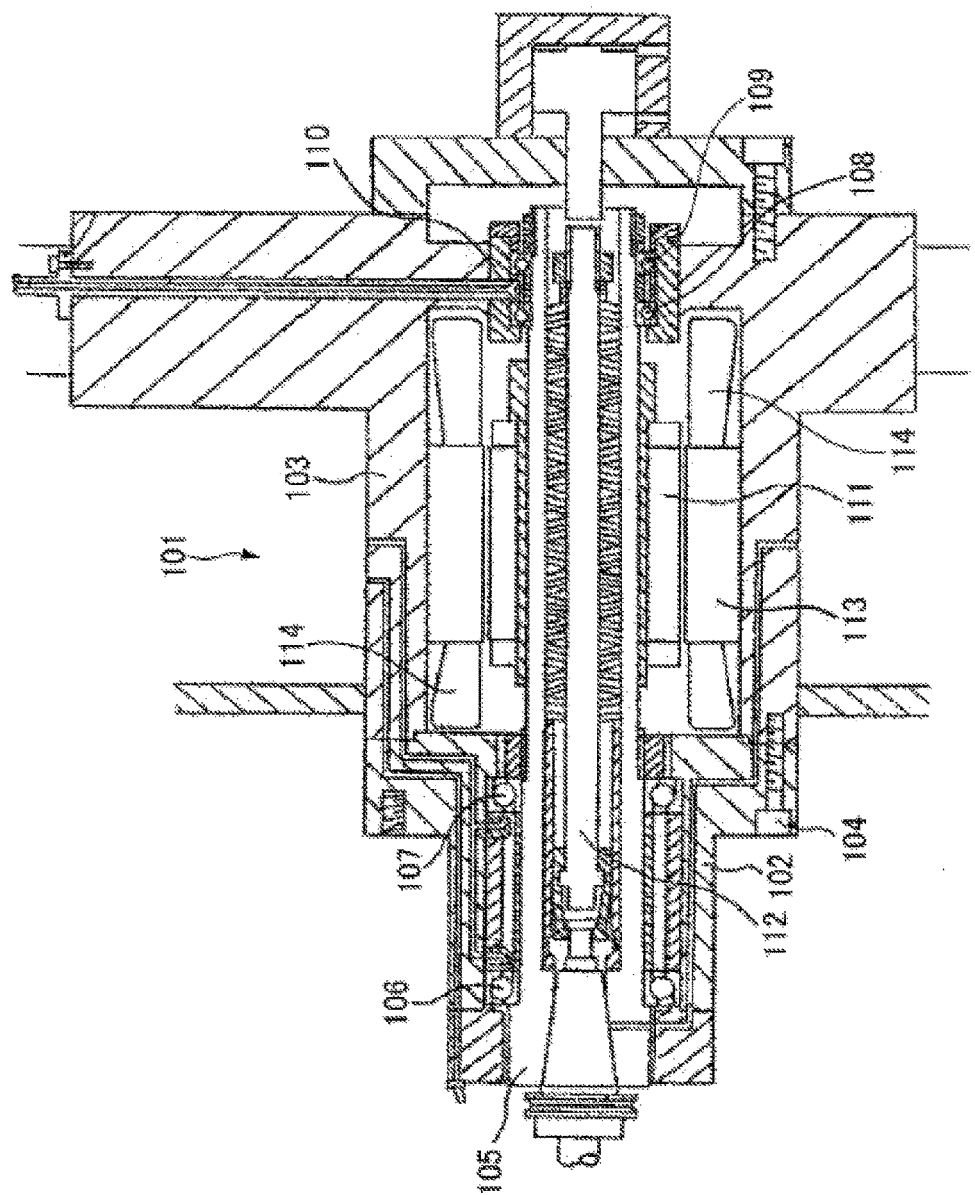
FIG. 7 is a sectional view depicting a spindle device of the related art.

Furthermore, in the above embodiments, in order to reduce the size, at least a part of the rear bearing housing or the bearing sleeve is arranged at the inner side of the end coil of the stator so as to overlap the end coil of the stator, as seen from the radial direction. However, the spindle device of the present invention is not limited thereto inasmuch as it configures the matched ball bearing of the above embodiments. For example, as shown in a modified embodiment of FIG. 6, the rear bearing housing 30 may not be arranged at the inner side of the end coil 73 of the stator 71.

Also, in the above embodiments, the four rows of angular ball bearings applied as the front bearing of the spindle device are described as the matched ball bearing. However, the matched ball bearing of the present invention is not limited thereto and may be a matched ball bearing including four rows or more of angular ball bearings arranged axially where angular ball bearings with two or more having contact angles in the same direction are arranged in the back-to-back combination.

Furthermore, the matched ball bearing of the present invention is not limited to the shape of the housing of the embodiments, and may be applied to any built-in motor type spindle device of which a rotary shaft is to rotatively drive by a built-in motor. That is, the spindle device of the present invention using the matched ball bearing may be a spindle device where each angular ball bearing having the smaller outer diameter is configured as a motor-side bearing close to the built-in motor and each angular ball bearing having the larger outer diameter is configured as a motor opposite-side bearing spaced from the built-in motor with respect to the motor-side bearing.

The present application is based on a Japanese Patent Application No. 2015-155270 filed on Aug. 5, 2015, the contents of which are incorporated herein by reference.

DESCRIPTION OF REFERENCE NUMERALS

M: spindle device
10: outer cylinder housing
20: front bearing housing
21: large-diameter outer peripheral surface
22: small-diameter outer peripheral surface
30: rear bearing housing
36: bearing sleeve
40: front bearing (matched ball bearing)
41, 51: motor-side bearing (angular ball bearing)
42, 52: motor opposite-side bearing (angular ball bearing)
60: rear bearing
61: motor-side bearing
62: motor opposite-side bearing
70: built-in motor
71: stator
72: rotor
73: end coil
80: rotary shaft

The invention claimed is:

1. A combined tandem rows of ball bearings comprising four or more rows of angular ball bearings axially aligned, two or more rows of the angular ball bearings with contact angles in a same direction being arranged in a back-to-back relation,
wherein the respective angular ball bearings have same inner diameters, respectively,
wherein the respective angular ball bearings with contact angles in the same direction have same outer diameters, respectively,
wherein the respective angular ball bearings with contact angles in different directions have different outer diameters, respectively, and
wherein with respect to at least the respective angular ball bearings having the larger outer diameters, the angular ball bearing positioned at an axially outboard side has a ball diameter and a contact angle greater than those of the angular ball bearing positioned at an axially inboard side.

2. The combined tandem rows of ball bearings according to claim 1, wherein with respect to at least the respective angular ball bearings having the larger outer diameters, the angular ball bearing positioned at the axially outboard side has a ball pitch circle diameter greater than that of the angular ball bearing positioned at the axially inboard side.

3. A spindle device comprising a rotary shaft rotatably supported to a housing via a front bearing and a rear bearing and configured to be rotatably driven by a built-in motor,
wherein the front bearing is configured by the combined tandem rows of ball bearings according to claim 1, and
wherein each angular ball bearing having a smaller outer diameter is configured as a motor-side bearing close to the built-in motor and each angular ball bearing having a larger outer diameter is configured as a motor opposite-side bearing spaced from the built-in motor with respect to the motor-side bearing.

4. The spindle device according to claim 3, wherein the housing comprises:
an outer cylinder housing to which a stator of the built-in motor is mounted,
a front bearing housing which is provided at a front part of the outer cylinder housing and to which an outer ring of the front bearing is internally fitted, and
a rear bearing housing which is provided at a rear part of the outer cylinder housing and to which an outer ring of the rear bearing is internally fitted or is supported via a bearing sleeve,
wherein an outer peripheral surface of the front bearing housing has a stepped shape having a large-outer peripheral surface and a small-diameter outer peripheral surface,
wherein at least a part of the small-diameter outer peripheral surface of the front bearing housing is arranged at an inner side of an end coil of the stator so as to overlap the end coil of the stator, as seen from a radial direction, and
wherein at least one of the motor-side bearings is internally fitted to the front bearing housing at a position at which it overlaps the small-diameter outer peripheral surface of the front bearing housing, as seen from the radial direction.

5. The spindle device according to claim 4, wherein the motor-side bearing and the motor opposite-side bearing are applied with a fixed-position preload, and
wherein an outer ring of the motor-side bearing is internally fitted to the front bearing housing with a fitting gap.

6. The spindle device according to claim 4, wherein the motor-side bearing and the motor opposite-side bearing are applied with a fixed-position preload, and
wherein an outer ring of the motor-side bearing is axially positioned with respect to the front bearing housing with an axial gap.

7. The spindle device according to claim 4, wherein an outer ring of the rear bearing is internally fitted to the bearing sleeve and the bearing sleeve is internally fitted to the rear bearing housing, and
wherein at least a part of the bearing sleeve is arranged at an inner side of an end coil of the stator so as to overlap the end coil of the stator, as seen from the radial direction.

8. The spindle device according to claim 4, wherein an outer ring of the rear bearing is internally fitted to the rear bearing housing, and
wherein at least a part of the rear bearing housing is arranged at an inner side of an end coil of the stator so as to overlap the end coil of the stator, as seen from the radial direction.

9. A machine tool including the spindle device according to claim 3.

10. The machine tool according to claim 9, wherein the spindle device is mounted on a tilt mechanism or a swivel mechanism.

* * * * *